United States Patent [19]

Rohrle

[11] Patent Number: 5,562,542
[45] Date of Patent: Oct. 8, 1996

[54] TORSION DAMPER, ESPECIALLY FOR A MOTOR VEHICLE

[75] Inventor: Dieter Rohrle, Montmorency, France

[73] Assignee: Valeo, Paris, France

[21] Appl. No.: 163,793

[22] Filed: Dec. 9, 1993

[30] Foreign Application Priority Data

Dec. 9, 1992 [FR] France ................. 92 14824

[51] Int. Cl.$^6$ .............................................. F16F 15/12
[52] U.S. Cl. .................................... 464/67; 464/68
[58] Field of Search ....................... 464/64, 66, 68; 192/106.9, 212, 214, 213; 74/574

[56] References Cited

U.S. PATENT DOCUMENTS

| | | | |
|---|---|---|---|
| 4,530,673 | 7/1985 | Lamarche . | |
| 4,595,039 | 6/1986 | Naudin | 464/66 |
| 4,747,801 | 5/1988 | Chasseguet et al. | 464/66 |
| 4,874,350 | 10/1989 | Casse et al. | 464/66 X |
| 4,899,617 | 2/1990 | Kobayashi et al. | 464/68 X |
| 4,950,205 | 8/1990 | Umeyama | 464/64 X |
| 5,052,244 | 10/1991 | Kamiya et al. | 464/66 X |
| 5,065,642 | 11/1991 | Kagiyama et al. | 464/68 X |
| 5,092,820 | 3/1992 | Naudin et al. | 464/66 X |
| 5,307,710 | 5/1994 | Feldhaus et al. | 464/68 X |
| 5,377,560 | 1/1995 | Schierling et al. | 464/68 X |
| 5,380,248 | 1/1995 | Kraus et al. | 464/68 |

FOREIGN PATENT DOCUMENTS 3931429  4/1990  Germany .

*Primary Examiner*—Daniel P. Stodola
*Assistant Examiner*—Eileen A. Dunn
*Attorney, Agent, or Firm*—Longacre & White

[57] ABSTRACT

A torsion damper, especially for a motor vehicle, comprises two coaxial parts, namely a primary coaxial part and a secondary coaxial part respectively, which are mounted for relative rotation of one with respect to the other against the action of resilient members acting circumferentially, with each of these resilient members extending lengthwise generally over an arc of a circle. At least one of the circumferential end portions of at least one of the resilient members is associated with deflecting members consisting of camming members, such that in operation, the circumferential end portion of the resilient members is urged radially towards the axis of the assembly, at least when the angular displacement between the two coaxial parts exceeds a predetermined amount.

10 Claims, 2 Drawing Sheets

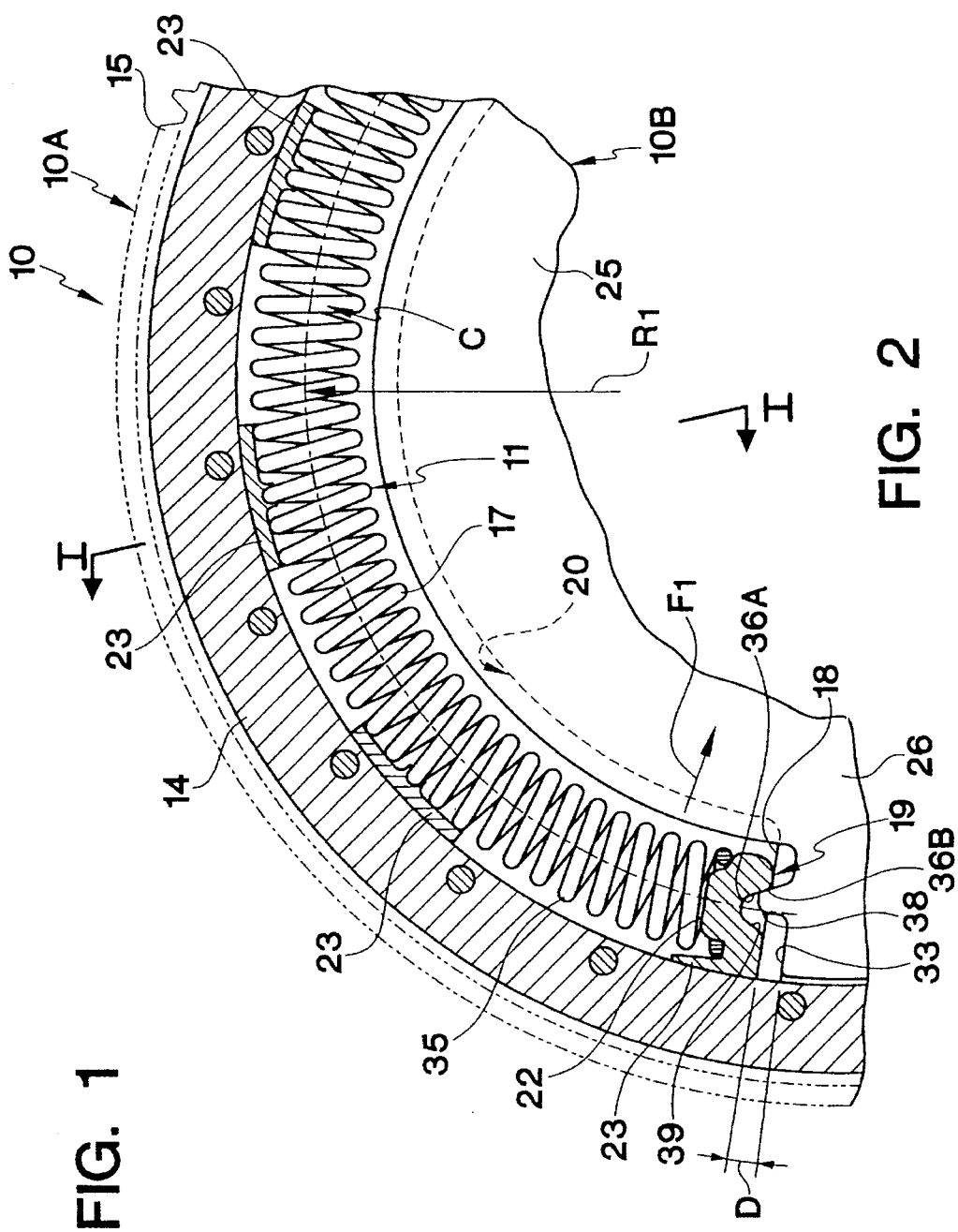

TORSION DAMPER, ESPECIALLY FOR A MOTOR VEHICLE

FIELD OF THE INVENTION

This invention relates to torsion dampers, especially for motor vehicles, of the kind comprising two coaxial parts, namely a primary coaxial part and a secondary coaxial part respectively, which are mounted coaxially with each other and arranged for rotation of one with respect to the other against the action of circumferentially acting resilient members (which in practice usually consist of springs), each of the said resilient members being aligned generally along an arc of a circle.

BACKGROUND OF THE INVENTION

Such a torsion damper is provided for the purpose of suitably absorbing vibrations between the engine and the roadwheels of the vehicle. This absorption of vibration involves the use of friction between the two coaxial parts of the damper. Commonly, this friction is at least due to friction means which are specifically provided for this purpose. However, the friction is also due to the contact which occurs between the resilient members and the primary coaxial part of the damper under the effects of centrifugal force acting on the resilient members in operation.

In at least some applications, the friction due to this last mentioned contact is parasitic friction when it occurs at low values of the angular displacement between the primary and secondary coaxial parts, and this is the case especially when the engine is in a slow running mode.

DISCUSSION OF THE INVENTION

An object of the invention is to provide a torsion damper in which this parasitic friction is minimised or eliminated altogether.

According to the invention, a torsion damper, especially for a motor vehicle, of the kind comprising two coaxial parts, namely a primary coaxial part and a secondary coaxial part respectively, which are mounted for rotation of one with respect to the other against the action of circumferentially acting resilient members, each of which extends lengthwise generally along an arc of a circle, is characterised in that deflecting means are associated with at least one of the circumferential end portions, of at least one of the said resilient members, such that in operation, the said circumferential end portion is urged radially towards the axis of the assembly, at least when the angular displacement between the said coaxial parts exceeds a predetermined amount.

The deflecting means preferably consist of camming means for bending the circumferential end portion of the resilient member progressively as a function of the said angular displacement.

In all cases, it is preferably provided that when the circumferential end portions of the resilient members are thus deflected radially inwardly, they are prevented from coming into radial contact with the primary coaxial part under the effects of centrifugal force.

The various features and advantages of the invention will appear more clearly on a reading of the detailed description of preferred embodiments of the invention which follows, and which is given by way of example only and with reference to the accompanying drawings.

BRIEF DESCRIPTION OF THE DRAWINGS

FIG. 1 is a view in axial cross section showing part of a torsion damper in one form in accordance with the invention, the cross section being taken on the line I—I in FIG. 2.

FIG. 2 is a partial view in transverse cross section taken on the broken line II—II in FIG. 1.

DESCRIPTION OF PREFERRED EMBODIMENTS OF THE INVENTION

Figure 3:
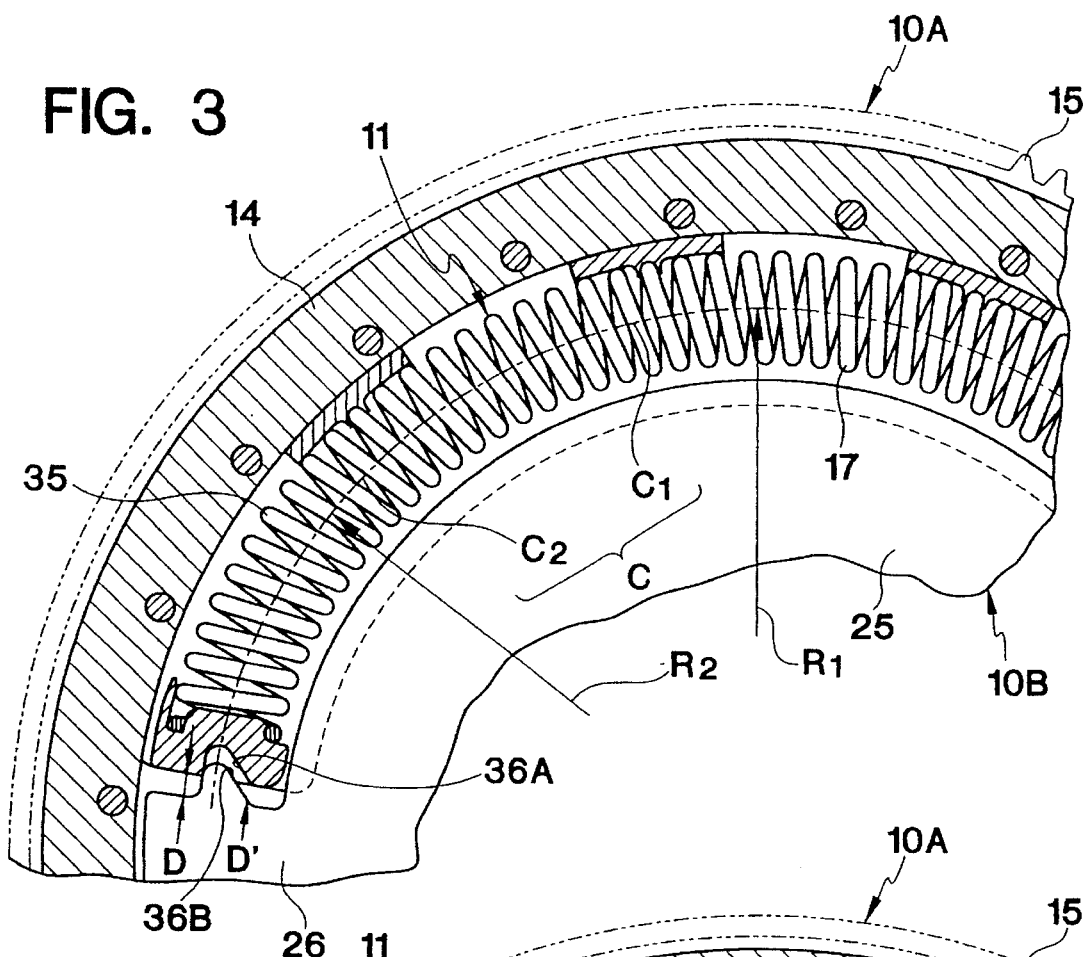
FIG. 3 is a partial view in transverse cross section similar to FIG. 2 but showing a second embodiment of the invention.

As shown in the drawings, and in a way generally already known per se, the torsion damper 10 comprises two coaxial parts, namely a primary coaxial part 10A and a secondary coaxial part 10B. The two coaxial parts 10A and 10B are mounted for limited relative rotation of one with respect to the other, against the action of a set of circumferentially acting resilient members 11. In this example these members 11 consist of at least one coil spring 17, each of which extends lengthwise over an arc C of a pitch circle common to all the springs 17, of radius R1. As shown, the springs 17 are curved so as to be centred on the pitch circle, but it should be noted that they need not be curved in this way.

In FIGS. 1 and 2, each resilient member 11 comprises a single spring 17 with its centre line lying on the arc C. In this example too, each arc C subtends more than 90 degrees at the centre of the circle. There are thus only two resilient members 11 on a common pitch circle, and the drawings show only part of one of these.

In the present example, the primary coaxial part 10A of the torsion damper comprises two annular, radial plates 12 and 13, which are spaced apart axially by an outer ring 14 over their outer peripheries, i.e. the periphery of each radial plate having a larger diameter. The outer ring 14 carries a starter crown 15. The radial height of the annular plate 12 is smaller than that of the annular plate 13, and the latter carries, at its inner periphery (i.e. that having the smaller diameter) a hub 16 for attachment, in this example, to the crankshaft of the engine of a motor vehicle.

The annular plates 12 and 13 have thrust surfaces 18 against which the resilient members 11 bear circumferentially in the rest or relaxed position. The thrust surfaces 18 of the plate 12 correspond with those of the plate 13. The ends of the members 11 are engaged on these thrust surfaces through spacing blocks 19, one of which is provided for this purpose at each of the circumferential ends of the resilient members 11. In this example the thrust surfaces 18 are defined by the circumferential ends of windows 20 which are formed locally through the annular plates 12 and 13, with the resilient members 11 being mounted in these windows. The spacing blocks 19 extend axially between the two annular plates 12 and 13, through the windows 20. For the purpose of centring the springs 17 which constitute the resilient members 11, each spacing block has a guide boss 22 projecting circumferentially towards the associated spring 17, which is engaged over the boss 22.

With reference to FIGS. 1 to 3, these Figures also show a set of shoes 23 which are spaced apart along each spring 17 on the same side of the latter as the outer ring 14. These shoes 23 act as spacers between the springs and the outer ring 14, so as to prevent the springs from coming into direct contact with the latter. In addition, and for the same purpose, each spacing block 19 has a circumferential extension 23' which is in contact with the outer ring 14.

In this example, the secondary coaxial part 10B comprises, firstly, an annular damper plate 25 which is located between the two annular plates 12 and 13 of the primary coaxial part 10A. The damper plate 25 has, firstly, radial arms 26 (FIGS. 2 to 4) which lie circumferentially between the spacing blocks 19 and which engage in the latter, at least beyond a predetermined angular displacement between the two coaxial parts 10A and 10B; and secondly, a plate 28 or reaction plate which lies outside the annular plates 12 and 13, on the same side of the torsion damper assembly as the shorter or radially narrower annular plate 12. The reaction plate 28 is secured on a hub 30 by means of screws 29. The hub 30 carries the annular damper plate 25. The plate 28 is (in this example) the reaction plate of a clutch having a friction disc, not shown, which is mounted on the input shaft of the gearbox of the vehicle, for rotation with that input shaft.

Disposed between the two coaxial parts 10A and 10B are a rolling bearing 31 and friction means 32. The two coaxial parts are connected together radially by the bearing 31, and axially by the friction means 32. These components are not relevant to the present invention as such and will not be described further here.

The radial edges 33 of the arms 26 of the annular damper plate 25 of the secondary coaxial part 10B lie, in this example, when in the relaxed state, at an angular distance D from the thrust surfaces 18 of the annular plates 12 and 13 of the primary coaxial part 10A (and therefore of the spacing blocks 19), so that it is only after an angular displacement D equal to this distance that, in operation, the arms 26 come into interfering engagement with the spacing blocks 19 and therefore with the resilient members 11.

The arrangements so far described here with reference to the drawings are well known in themselves. As they are not part of the present invention itself, there is no need to describe them in greater detail here.

Means are provided for deflecting at least one of the circumferential end portions 35 of at least one of the resilient members 11 radially inwardly as indicated by the arrow F1 in FIG. 2, at least when the angular displacement between the two coaxial parts 10A and 10B exceeds a predetermined amount. In the embodiments here described, these deflecting means are applied to both circumferential end portions 35 of each of the resilient members 11. In the examples described, these deflecting means take the form of camming means which are such as to apply progressive bending to the associated end portions 35, as a function of the said angular displacement.

In practice, the foregoing only relates to that one of the circumferential end portions 35 of each resilient member 11 which is on the downstream side in the direction of angular displacement in the forward direction, and the end portion 35 which is upstream in the direction of the angular displacement when this is in reverse. Although, in the forward and reverse directions, the upstream and downstream end portions 35 are therefore not of concern, having regard to the intermediate engagement points provided by the shoes 23, this other circumferential end portion 35 is still active circumferentially at that time.

In the present embodiments, the deflecting means comprise, on at least one of the arms 26 of the annular damper plate 25 of the secondary coaxial part 10B, and on at least one of the spacing blocks 19 between which that arm 26 is inserted, pairs of complementary camming surfaces 36A, 36B.

Here, at least one of the arms 26 of the annular damper plate 25, and in practice each of these arms, has a finger 38 projecting from at least one of its radial sides 33 (and in practice both of these sides). Each finger 38 extends circumferentially towards the corresponding spacing block 19. Each camming surface 36B is formed on a respective one of the fingers 38, while the associated spacing block 19 has a hollow seating 39 which is adapted to receive the finger 38. The associated complementary camming surface 36A is formed in this seating 39.

Thus, in each finger, the circumferential edge of the finger 38 defines the camming surface 36B which is the innermost one in the radial sense, and this surface extends generally obliquely away from the axis of the assembly as it approaches the associated spacing block 19. In practice this circumferential edge of each finger 38 is defined on the corresponding portion of the finger, that is to say that portion which is facing radially inwardly towards the axis of the assembly, and the corresponding seating 39 of the spacing block 19 can be reduced to an opening which is adapted to be engaged by the finger 38.

In the arrangement shown in FIGS. 1 and 2, the camming surfaces 36A and 36B are in contact with each other in the rest position. In forward running, the deflecting means constituted by the camming surfaces therefore begin to act once angular displacement commences between the two coaxial parts 10A and 10B. In other words, the corresponding circumferential end portion 35 of the resilient members 11 is drawn radially towards the axis of the assembly as soon as angular displacement begins. The resilient member is thus prevented from bearing directly on the outer ring 14 under the effects of centrifugal force. Accordingly, any parasitic friction which could occur is avoided.

As regards the intermediate engagement points afforded by the shoes 23, a circumferential end portion 35 is only able to act circumferentially between the coaxial parts 10A and 10B at low values of the angular displacement of the latter. It acts only when the angular displacement between the two parts 10A and 10B becomes greater than the angular distance D between the spacing blocks 19 and the arms 26 of the annular damper plate 25 of the secondary coaxial part 10B. It will of course be understood that this angular distance D may be zero, according to particular applications.

Figure 4:
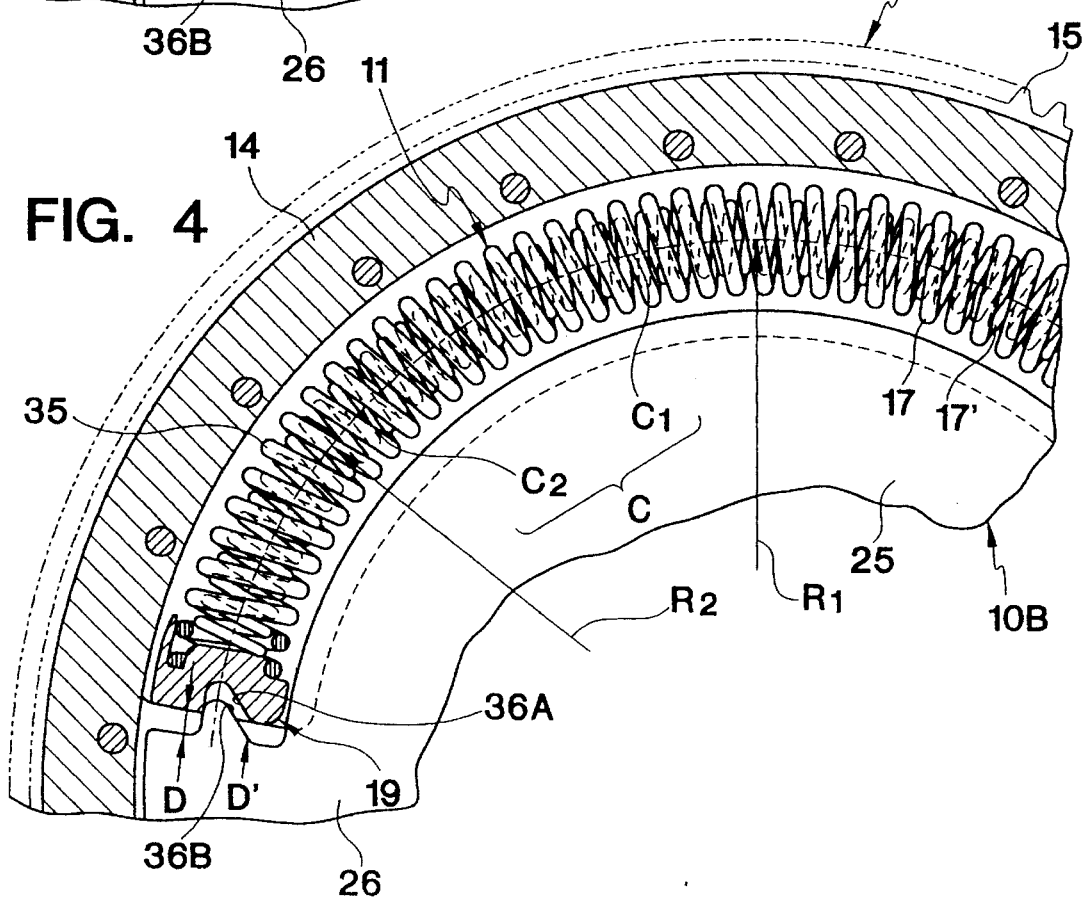
FIG. 4 is a partial view in transverse cross section, again similar to FIG. 2, showing a third embodiment.

Referring now to FIGS. 3 and 4, at least one of the circumferential end portions of at least one of the resilient members 11 here extends, in the rest position, and as manufactured, along a circular arc C2, the radius R2 of which is smaller than the radius R1 of the arc C1 of the pitch circle on which the central axis of a resilient member 11 lies. The arcs C1 and C2 together constitute the total arc C described above. As a result, in the rest position, a circumferential end portion 35 is already spaced radially away from the outer ring 14 of the primary coaxial part 10A. In addition, the camming surfaces 36A and 36B are then spaced away from each other in this rest position. In this case, the deflecting means comprising the camming surfaces 36A and 36B are therefore only effective when the angular displacement between the coaxial parts 10A and 10B exceeds a predetermined value D'. This value of angular displacement D', which is defined by the angular distance D' separating the two camming surfaces 36A and 36B from each other in the rest position, may or may not be the same as the angular displacement D described above.

In practice, it is arranged, that, in slow running at dead centre, centrifugal force leads to an equilibrium which results in a neutral configuration for the resilient members 11. The same arrangements are provided at the other end of each of the resilient members 11.

As will have been noted from the foregoing, it is the radially outermost circumferential edge of each finger 38 which, in FIG. 3, cooperates initially with the seating 39; and the same is true in FIG. 4, which is described below. Accordingly, in service, the finger 38 changes its engagement from its radially outer edge to its radially inner edge.

In FIG. 4 at least one of the resilient members 11 consists of two coaxial springs 17 and 17'. Also in FIG. 4, at least one of these resilient members 11 is free to make contact with the outer ring 14 of the primary coaxial part 10A at at least one point along its length. As before, arrangements are provided of the same type for all of the resilient members 11. The method of operation remains generally similar to that already described above. However, due to the absence of the intermediate engagement points provided in the other embodiments by the shoes 23, the length over which the resilient members 11 are engaged on the outer ring 14 under the effects of centrifugal force varies with the running mode of the engine and the torque, and the same is true (but inversely) for the dynamic stiffness of the resilient members 11. In this arrangement, the outer ring 14 may have a suitable coating or other treatment so as to withstand contact with the springs 17.

The present invention is of course not limited to the embodiments described above and shown in the drawings, but includes any practical modification and/or combination of the various elements of the embodiments described. In particular, the points of engagement of the resilient members on the annular plates of the primary coaxial part may be defined by blocks which are suitably carried for this purpose on the annular plates. In addition, the fingers which define the camming means may be formed on the spacing blocks, with the corresponding seatings then consisting of slots extending circumferentially in the annular damper plate.

The circumferential end portions of the resilient members may, instead of extending over a circumference having a reduced radius, or alternatively in a manner complementary to this arrangements, form a bend with the main, middle portion of the resilient members.

In conformity with arrangements of the same type as those described for example in the specification of published German patent application DE 3 931 429A, the cavity in which the resilient members are disposed may be enclosed, so as to contain grease.

Finally, the invention is especially applicable to clutches having a friction disc, which are of the same type as that described in U.S. Pat. No. 4,530,673.

What is claimed is:

1. A torsion damper comprising:

a primary part;

a secondary part arranged coaxially with respect to the primary part and rotatable relative to the primary part;

circumferentially acting resilient members arranged between said primary and secondary parts and acting between said primary and secondary parts, the primary and secondary parts defining a circle with each of the resilient member extending lengthwise over an arc of the circle, each resilient member having a circumferential end portion; and, deflecting means for deflecting at least one of the circumferential end portions of at least one of the resilient members radially inwardly, wherein the deflecting means comprise camming means for bending said circumferential end portion in accordance with the degree of angular displacement between the primary and secondary parts.

2. A torsion damper according to claim 1, wherein the camming means are arranged to bend the circumferential end portion progressively as a function of the said angular displacement.

3. A torsion damper according to claim 1, wherein the primary part comprises a pair of annular plates, an outer ring joining the annular plates and spacing said annular plates apart axially, with one of said annular plates defining thrust surfaces and the other said annular plate defining further thrust surfaces corresponding with the thrust surfaces of said one annular plate, and spacing blocks arranged between the resilient members and the thrust surfaces so that the resilient members bear circumferentially on said thrust surfaces in the relaxed condition of the torsion damper, the secondary part comprises an annular damper plate arranged between said annular plates of the primary part, the annular damper plate having radially arms extending circumferentially between the spacing blocks, and further comprising deflecting means for interference between said arms and said spacing blocks, at least when said angular displacement between said primary and secondary parts exceeds a predetermined amount, and wherein said deflecting means comprise complementary camming surfaces formed on at least one of said arms and, in cooperation therewith, on at least one of said spacing blocks.

4. A torsion damper according to claim 3, wherein each said arm of the annular damper plate includes a finger projecting circumferentially towards an associated said spacing block, one said camming surface being formed on said finger, with the associated said spacing blocks having a hollow seating for receiving the said finger and defining the associated complementary camming surface.

5. A torsion damper according to claim 4, wherein the camming surface formed on said finger is formed on the radially inner circumferential edge of the finger and extends generally obliquely away from the axis of the assembly towards its free end.

6. A torsion damper according to claim 1, wherein in the rest position, at least one of the resilient members defines a first arc of a circle over which a middle part of the resilient member extends, and a second arc of a circle over which its end portion extends, the radius of said second arc being smaller than that of the first arc, said first and second arcs together constituting said arc of a circle over which the whole of the said resilient member extends.

7. A torsion damper according to claim 1, having said deflecting means at both ends portions of each said resilient member.

8. A torsion damper according to claim 1, wherein each said resilient member comprises at least one spring.

9. A torsion damper according to claim 8, having a said deflecting means associated with each said resilient member.

10. A torsion damper according to claim 1, wherein at least one of said resilient members is free to make contact with said outer ring at at least one point along its length.

* * * * *